No. 753,439. PATENTED MAR. 1, 1904.
D. S. SINCLAIR.
SHAFT COUPLING.
APPLICATION FILED JUNE 3, 1902.
NO MODEL.

Witnesses
A. J. Holbourne
J. W. Zorbelin

Inventor.
Duncan S. Sinclair
by Ridout & Maybee
Attys

No. 753,439. Patented March 1, 1904.

UNITED STATES PATENT OFFICE.

DUNCAN S. SINCLAIR, OF WIARTON, CANADA.

SHAFT-COUPLING.

SPECIFICATION forming part of Letters Patent No. 753,439, dated March 1, 1904.

Application filed June 3, 1902. Serial No. 110,081. (No model.)

*To all whom it may concern:*

Be it known that I, DUNCAN S. SINCLAIR, a resident of the town of Wiarton, in the county of Bruce, Province of Ontario, Canada, have invented certain new and useful Improvements in Shaft-Couplings, of which the following is a specification.

The object of my invention is to devise a shaft-coupling which will securely connect shaft ends without requiring the use of bolts or keys, which is adapted for the coupling of shafts of different diameters, and in which the holding power of the coupling is increased as the strain on the shafting increases; and it consists, essentially, of tapered split sleeves placed in position one on each of the shaft ends and of male and female coupling members adapted to engage the outer surfaces of the said sleeves and threaded to screw together, so that the rotation of one part of the shaft against a resistance applied to the other part of the shaft will screw the couplings together and cause the sleeves to tightly grip the shaft ends, substantially as hereinafter more specifically described and then definitely claimed.

Figure 1:
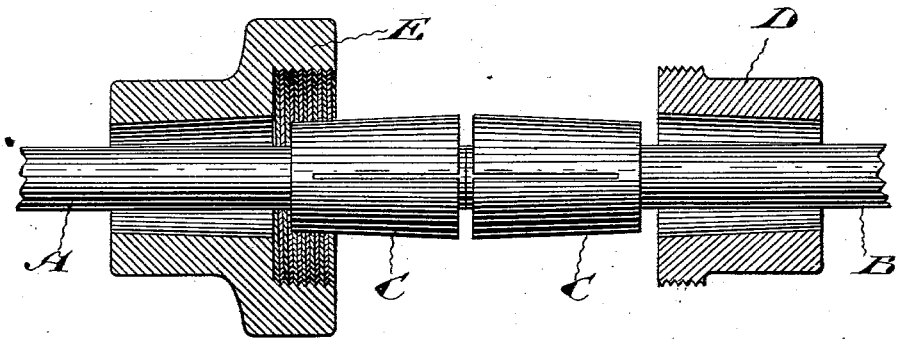
Figures 2, 3:
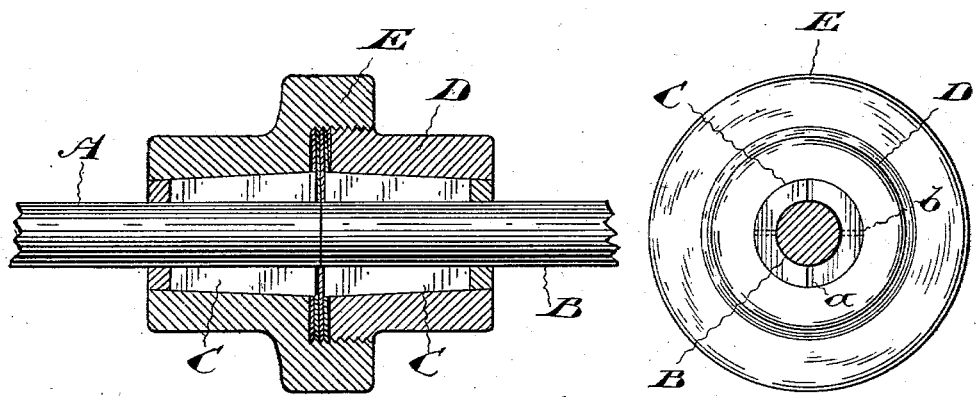
Figure 4:
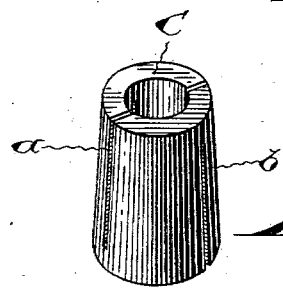

Figure 1 is a longitudinal sectional elevation of my improved coupling, showing the parts disconnected. Fig. 2 is a longitudinal section showing the parts connected. Fig. 3 is an end elevation of the coupling. Fig. 4 is a perspective detail of one of the sleeves.

In the drawings like letters of reference indicate corresponding parts in the different figures.

In Figs. 1 and 2, A and B represent the ends of two sections of shafting to be joined together. On each end is placed a tapered split sleeve C. These sleeves, as more particularly shown in Fig. 4, are split in a peculiar manner. A cut $a$ is made through the sleeve from one end almost to the other. A similar cut $b$ at right angles to the first is made from the other end of the sleeve almost to the first-mentioned end. The result of this method of cutting is that the sleeve is compressible and yet at the same time the parts are always held in working position relative to one another.

As already described, each sleeve is tapered, and the sleeves are placed on the shaft ends so that they taper outwardly from the center or point of junction of the shafting.

D and E are male and female coupling members, respectively tapered internally to correspond with the taper of the sleeves C. The coupling members are also screw-threaded, as indicated in Fig. 2.

The mode of connecting the ends of the two sections of shafting is substantially as follows: Two sleeves C are placed in position, as shown in Fig. 1. Coupling members are slipped over them and screwed together until they compress the sleeves against the shaft. If now the shaft is started in rotation against some resistance, the frictional connection between the ends of the shafting, the sleeves, and the coupling members will cause the latter to be still more tightly screwed together, which in turn causes a tighter gripping of the sleeves on the shafting. The greater the strain on the shafting the greater the tendency to screw the coupling members together, and thus still further increase the grip of the sleeves on the shafting. From this construction it follows that the coupling always responds to any strain that may be put upon it, never slipping under any circumstances, as any increase in strain only strengthens the grip at the joint.

It will be seen that the strength of the coupling does not depend on the screwing together of the coupling by hand, which is the weak point of existing friction-couplings, as it is impossible by hand-power to give a coupling a sufficient grip on shafting to withstand the strain to which the coupling must be subjected. It should be observed that the screw-threads of the members of the coupling are cut right or left handed, according to the direction in which the shaft will rotate. It will also be seen in Fig. 2 that although the coupling is shown in operative position with the tapering split sleeves tightly gripping their respective shafts, yet the male and female coupling members are not quite screwed home, so as to butt one against the other, so that it is possible still under exceptional circumstances that the male and female members may be still further screwed together, so as to increase the frictional grip of the tapered split sleeves on the shafting.

What I claim as my invention is—

1. In a shaft-coupling, the combination with two shafts, of two tapered split sleeves one on each shaft end, said sleeves being loose on their shafts and substantially flat at their adjacent ends whereby they have no positive connection with each other or with the shaft; and male and female coupling members adapted to engage the said sleeves and threaded to screw the one into the other, substantially as described.

2. In a shaft-coupling the combination with two shafts, of two split sleeves placed one on each shaft end, and tapered from the center outward, said sleeves being loose on their shafts and substantially flat at their adjacent ends whereby they have no positive connection with each other or with the shaft; and male and female coupling members tapered internally to engage the said sleeves and threaded to screw the one into the other, substantially as described.

3. In a shaft-coupling, the combination with two shafts, of two tapered sleeves one on each shaft end, said sleeves being loose on their shafts and substantially flat at their adjacent ends whereby they have no positive connection with each other or with the shaft, each sleeve being split from each end to a point in proximity to the opposite end; and male and female coupling members adapted to engage the said sleeves and threaded to screw the one into the other, substantially as described.

4. In a shaft-coupling, the combination with two shaft ends, of two split sleeves placed one on each shaft end and tapered from the center outward, said sleeves being loose on their shafts and substantially flat at their adjacent ends whereby they have no positive connection with each other or with the shaft; and male and female coupling members tapered internally to engage the said sleeves and threaded to screw one into the other, the length of the threading being such that the male and female coupling members will be slightly separated at their inner parallel surfaces when under the tightest strain, substantially as described.

Wiarton, May 27, 1902.

DUNCAN S. SINCLAIR.

In presence of—
W. N. MUNRO,
MARY SINCLAIR.